Figure 1:
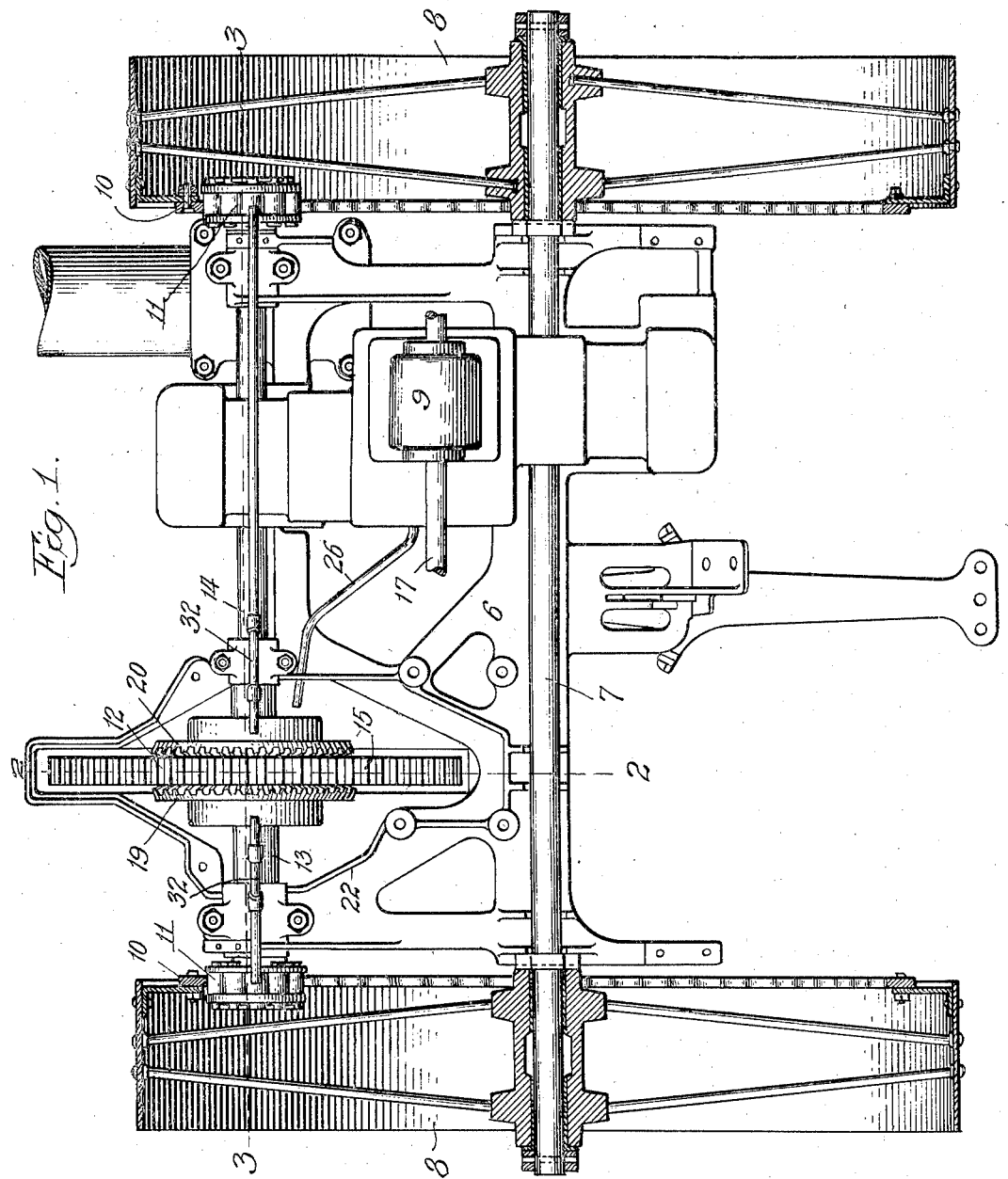

L. W. MELCHER.
LUBRICATION FOR TRACTORS.
APPLICATION FILED JUNE 12, 1918.

1,334,547.

Patented Mar. 23, 1920.
3 SHEETS—SHEET 1.

Witness:
John Enders

Inventor:
Lee W. Melcher
by Fred Gerlach
his Atty.

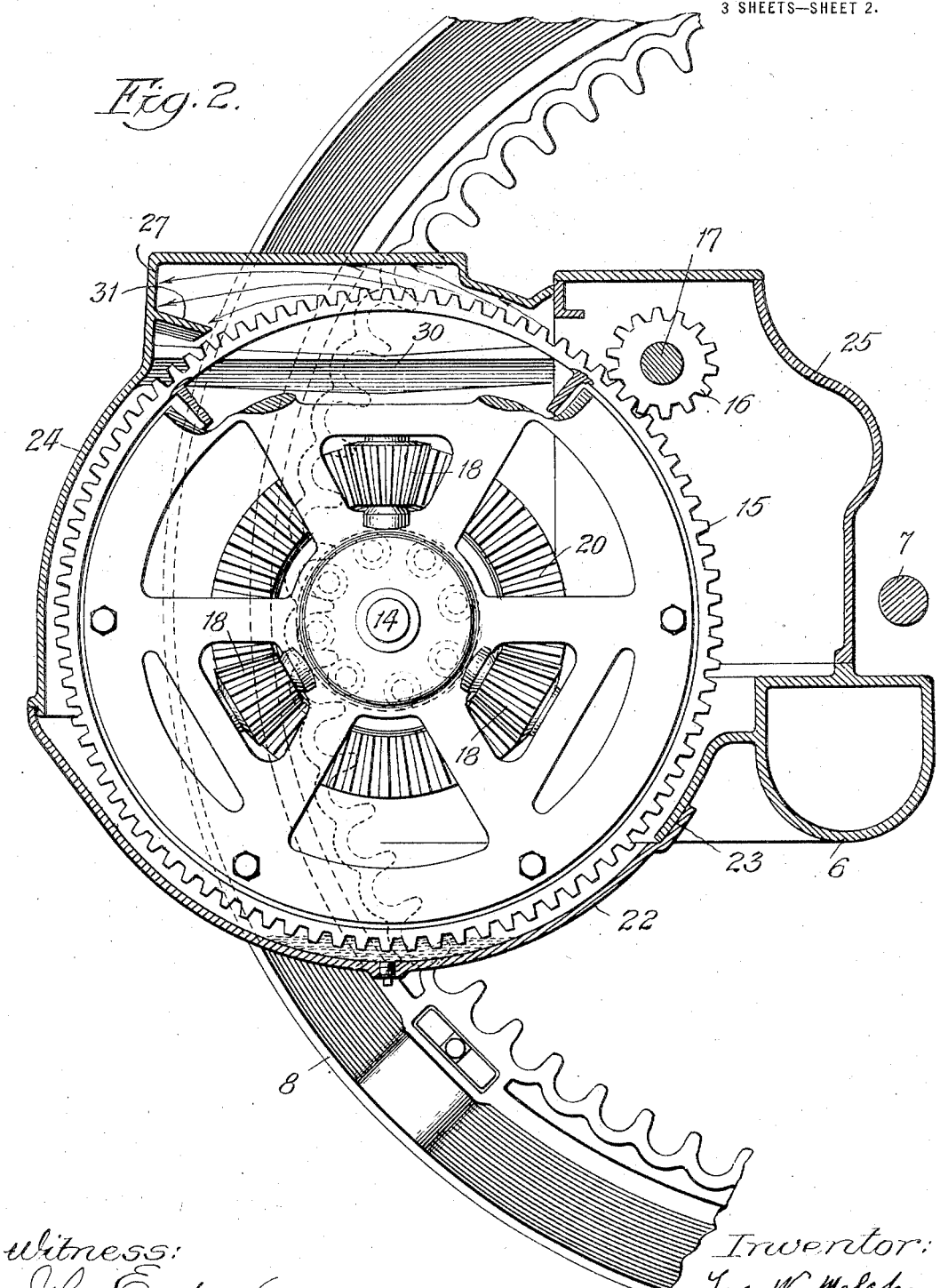

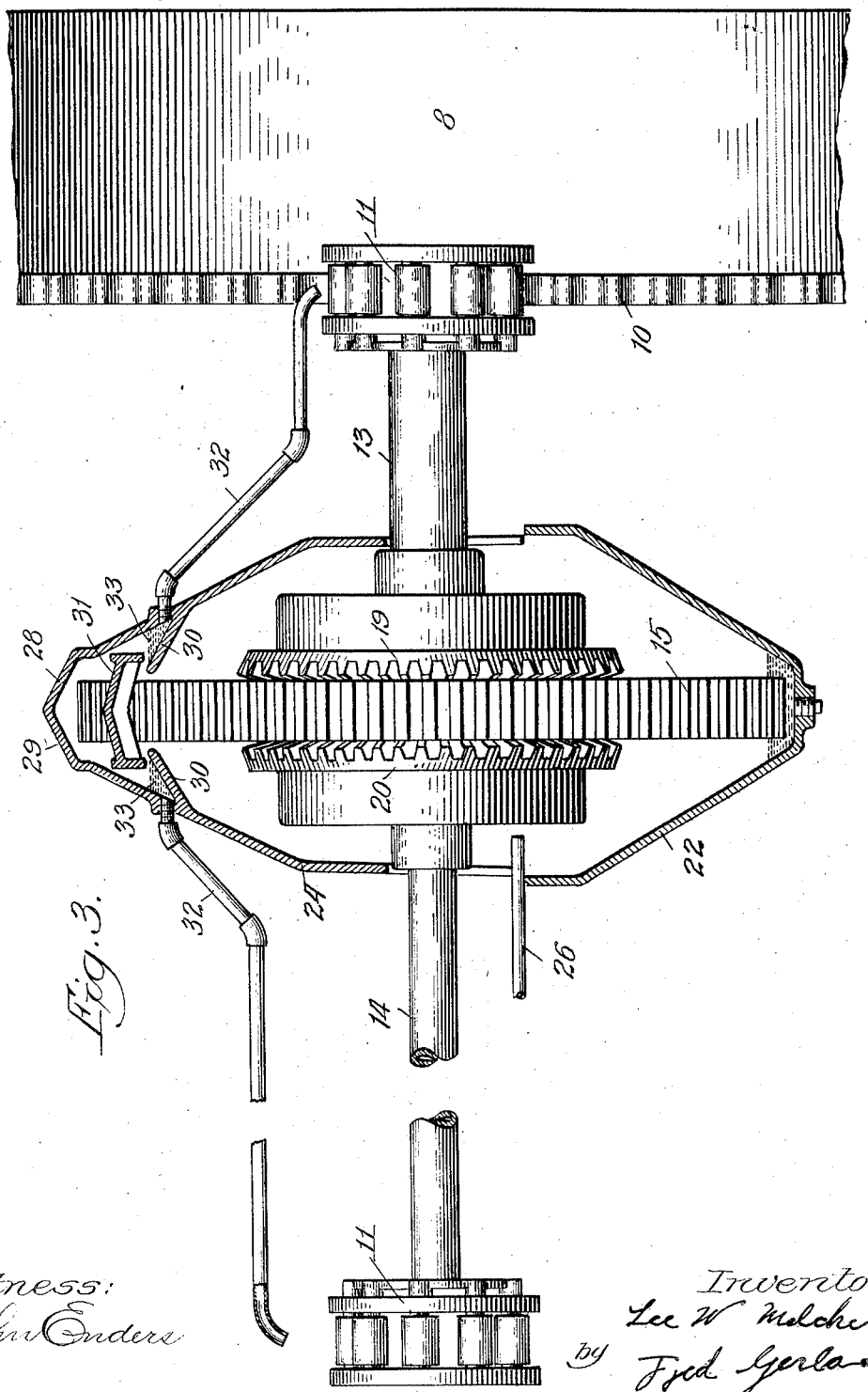

UNITED STATES PATENT OFFICE.

LEE W. MELCHER, OF LA CROSSE, WISCONSIN, ASSIGNOR TO LA CROSSE TRACTOR CO., OF LA CROSSE, WISCONSIN, A CORPORATION OF DELAWARE.

LUBRICATION FOR TRACTORS.

1,334,547.  Specification of Letters Patent.  Patented Mar. 23, 1920.

Application filed June 12, 1918. Serial No. 239,540.

*To all whom it may concern:*

Be it known that I, LEE W. MELCHER, a citizen of the United States, and a resident of La Crosse, in the county of La Crosse and State of Wisconsin, have invented certain new and useful Improvements in Lubrication for Tractors, of which the following is a full, clear, and exact description.

The invention relates to lubrication for tractors.

In practice, it has been found that a motor will be more efficiently lubricated by gradual supply of fresh lubricating oil, but for economy it has been generally the practice to permit the oil to remain in the crank-case until it has been consumed. One object of the present invention is to provide an improved lubricating system in which oil that has been used in the motor for a time is delivered to the transmission gearing to keep the latter lubricated. The oil from the motor has been found to be sufficient for lubricating the gearing on the tractor and in this way oil is used for a time in the motor and then delivered to the gearing.

A further object of the invention is to provide improved means for lubricating the gearing for driving the traction-wheels.

The invention consists in the several novel features hereinafter set forth and more particularly defined by claims at the conclusion hereof.

In the drawings: Figure 1 is a plan of a portion of a tractor embodying the invention, the traction wheels being shown in section. Fig. 2 is a vertical section taken on line 2—2 of Fig. 1. Fig. 3 is a transverse section taken on line 3—3 of Fig. 1.

The invention is shown as applied to a tractor comprising a supporting frame 6 of any suitable construction, an axle 7 from which the frame is suspended, traction-wheels 8 in which the ends of the axles are respectively held, a motor 9 suitably mounted on the frame, internally toothed gear-rings 10 secured to the traction-wheels respectively, pinions 11 for engaging said gear-rings respectively, differential gearing 12 connected to the pinions 11 by shafts 13 and 14 respectively. The differential gearing comprises a gear-wheel 15 that is driven by a pinion 16 on a shaft 17 which is driven by suitable variable speed transmission gearing (not shown) from the motor in any suitable manner. The differential gearing also comprises pinions 18 mounted on the radial arbors in the gear 15 which mesh with gears 19 and 20 on the ends of the shafts 13 and 14 respectively to drive the pinions and traction wheels at the sides of the tractor respectively.

A case comprises a lower section 22 which is joined to the frame 6, as at 23, a cover section 24 and a back-section 25. These sections together form a case for the differential gearing and pinion 16 which is adapted to contain lubricating oil. Lubricant will be fed to the crank-case of the motor in any well known manner and a pipe 26 conducts the overflow from the crank-case of the motor into the differential-gear case. The gear 15 rotates in the accumulation of oil on the bottom of the case, splashes it in the case and carries some of it upwardly and throws it adjacent the top of the gearing. The top of this case is formed with downwardly and outwardly sloping walls 28 and 29. At the sides of the gear 15 inclined walls 30 are formed on the sides of the case and these form oil pockets 33, one at each side of said gear. Centrifugal force causes the oil to be thrown from the gear 15 against the divergent walls 28 and 29 and from the latter the oil drips into the pockets 33 at the sides of gear 15. On the end wall 27 of the case, there is formed a baffle 31 that slopes laterally and downwardly from its middle and inwardly from wall 27 to direct the oil splashed against the end-wall 27 laterally into the oil-pockets 33. From each of the oil-pockets 33, a pipe 32 leads to one of the pinions 11 to lubricate said pinions and the gear-rings 10 on the traction-wheels. The splash in the case lubricates gears 19 and 20 and pinions 18.

The invention exemplifies an improved lubricating system in which the overflow from the motor is utilized to lubricate the differential gearing and is distributed by said gearing for delivery to the pinions and gear-rings for driving the traction wheels. Also a simple structure by which lubricant is delivered from the transmission gearing to the drive pinions in the traction-wheels. Also a lubricating system that is simple in construction and includes no special operating means, such as a pump.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. The combination with a tractor, comprising a frame, a motor on the frame, traction wheels, and gearing for driving the traction-wheels, of means for delivering fresh lubricant to the crank-case and means for conducting lubricant from the crank-case of the motor to the gearing.

2. The combination with a tractor comprising a frame, a motor on the frame, traction-wheels, differential gearing and gearing comprising pinions and gear-rings on the traction wheels respectively, of means for conducting lubricant from the crank-case of the motor to the differential gearing and from the differential gearing to said pinions and gear-rings.

3. The combination with a tractor, comprising a frame, a motor on the frame, traction wheels at the sides respectively, transmission gearing driven by the motor, a case for said gearing adapted to contain lubricant, and gears outside of the case, driven by the transmission gearing, for driving the traction wheels respectively, of means for conducting lubricant from the motor to said case, and means for conducting splash lubricant from the case to said gears.

4. The combination with a tractor comprising a frame, a motor, transmission gearing driven by the motor, a case for said gearing, traction wheels, gears and pinions driven by the transmission gearing, for driving the traction wheels respectively and disposed outside of the case, of means in said case to receive the lubricant splashed by the transmission gearing, and means for conducting lubricant from the receiving means to the outside of the case and to the gears and pinions for driving the traction wheels respectively.

5. The combination with a tractor comprising a frame, a motor, traction wheels, transmission gearing driven by the motor, a case for said gearing adapted to contain lubricant and gears outside of the case for driving the traction wheels, of separate oil pockets adapted to receive lubricant splashed in the case, and means for separately conducting lubricant from the pockets to the gears respectively.

6. The combination with a tractor comprising a frame, a motor, traction wheels, transmission gearing driven by the motor, a case for said gearing adapted to contain lubricant and gears outside of the case for driving the traction wheels, of separate oil pockets adapted to receive lubricant splashed in the case, a distributing means to deflect the splashed lubricant into said pockets, and means for separately conducting lubricant from the pockets to the gears respectively.

7. The combination with a tractor comprising a frame, a motor, traction wheels, transmission gearing and a case for said gearing adapted to contain lubricant, of separate oil pockets at the sides of the case adapted to receive splashed lubricant, a distributing device in the case for directing the lubricant into said pockets, a plurality of elements to be lubricated, and means for separately conducting the lubricant from said pockets to said elements.

LEE W. MELCHER.